Jan. 29, 1929.
N. H. GAY
1,700,632
QUICK CONNECTION VALVE
Filed March 3, 1927
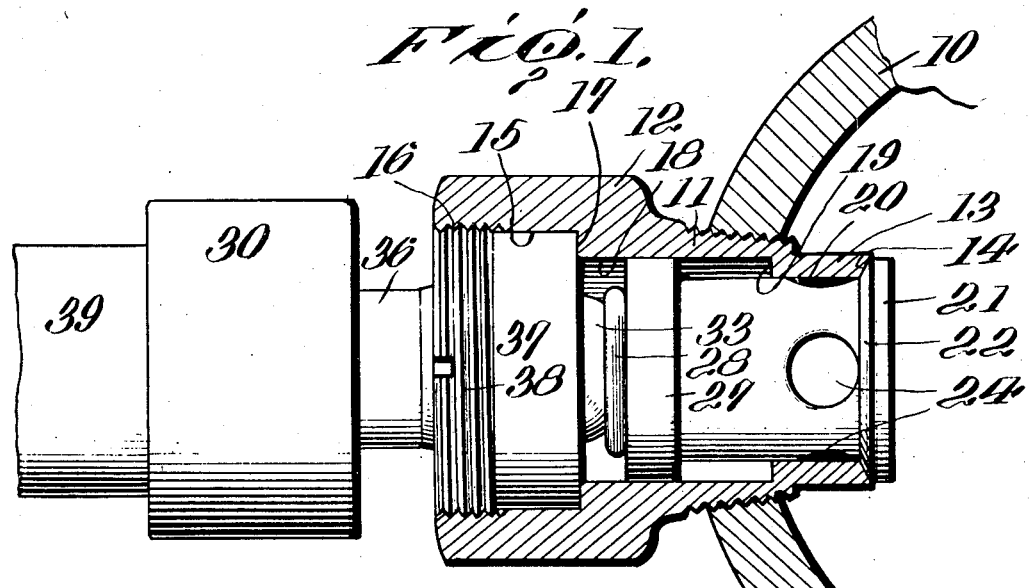
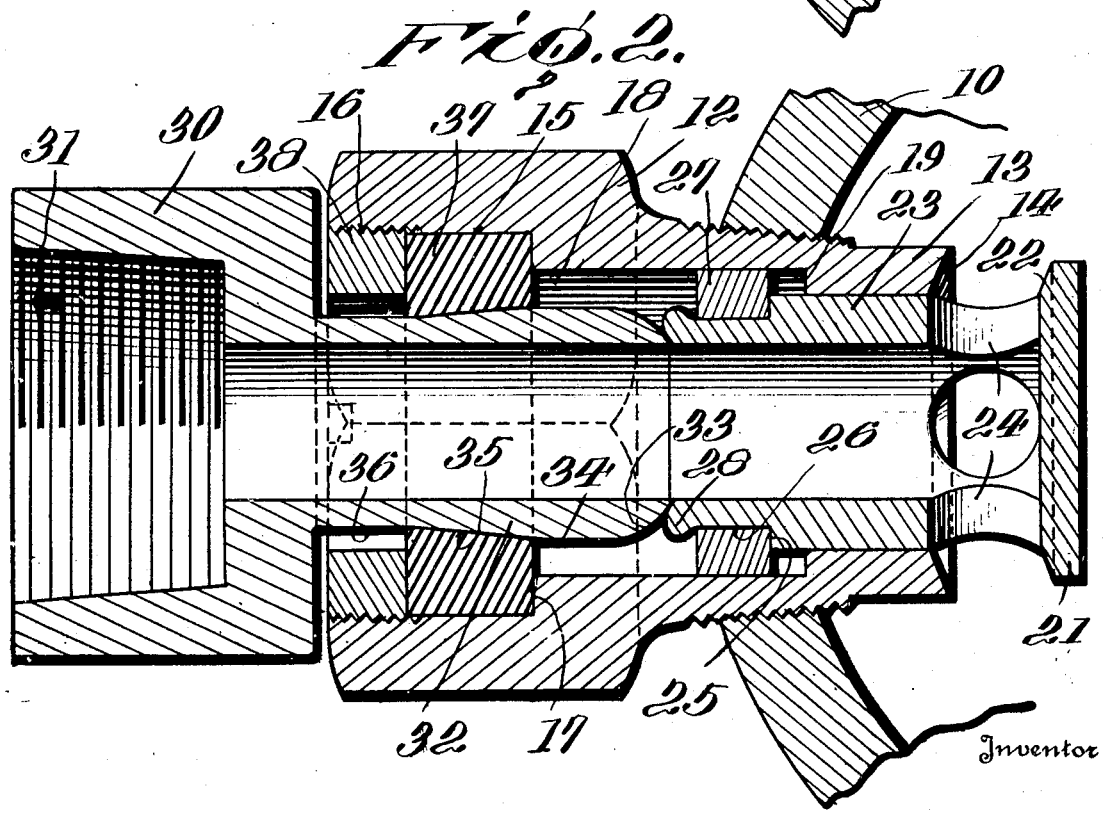
Inventor
Norman H. Gay,
By
Stewart & Mason
Attorneys Patented Jan. 29, 1929.

1,700,632

UNITED STATES PATENT OFFICE.

NORMAN H. GAY, OF LOS ANGELES, CALIFORNIA.

QUICK-CONNECTION VALVE.

Application filed March 3, 1927. Serial No. 172,373.

This invention relates to improvements in quick connection valves, and is particularly adapted for employment in refrigerating plants.

It is already old and well known to employ a trickle of air under low pressure through a freezing can in a refrigerating plant during the manufacture of artificial ice from raw water. In the harvesting of ice, it is necessary to disconnect the air line from the individual can: and during the re-preparation of the can for a further freezing, this connection must again be made. Since the output of the plant is limited by the time required for harvesting and re-preparing the cans, it is essential that quick connections should be employed in the air lines. Two general types of apparatus are known in the art (1) refrigerating plants have been provided with fixed mains and laterals with individual tap connections for the individual cans; and (2) such plants have been constructed with fixed mains having branch outlets of quick connection type to each of which a movable lateral pipe may be rapidly connected, which itself is provided with similar branch outlets to which individual air connections may be made for the individual cans.

The present invention will be described in connection with a form of pipe line which may be employed to either purpose; but it must be understood that the invention is not limited solely to such employment, but may find a wide range of use in the mechanical arts.

On the accompanying drawing—

Figure 1 represents a valve according to this invention, with the valve body in section and showing the connection plug and other valve elements in elevation, and Fig. 2 is a similar view, showing all parts in section, with the valve closure member in the "open" position.

In this drawing, the air line 10, which is either a main or lateral, as the case may be, is provided with a threaded aperture in its wall to receive a threaded portion 11 of the valve body 12, which has a reduced inwardly extending sleeve 13 thereon, with an inwardly chamfered valve seat 14. The enlarged outer end of the valve body 12 has a large internal bore 15 terminating near its mouth in the screw threads 16: and providing at its inner end, a shoulder 17 leading to the cylindrical cavity 18, which in turn has a shoulder 19 leading to a further cylindrical cavity 20.

In manufacture, the cavities 15, 18 and 20 extend through the entire valve body, whereby the manufacture of this body is very simple.

The valve closure comprises an end plate 21 having a beveled inner surface 22 to mate with and establish a valve seat on the chamfered surface 14 of the valve body 12. Rigidly joined to this plate 21, is a hollow annular piston sleeve 23 which forms a substantially tight sliding fit in a cylindrical passage 20 of the valve body, and which has through its wall and immediately adjacent to the end plate 21, a series of apertures 24 for the passage of air from its exterior to its interior. At its end within the valve body 12, this hollow piston sleeve 23 is provided with a shoulder 25 leading to a reduced portion 26 which receives the brass guide bushing 27 which forms a close sliding fit in the cylindrical chamber 18 of the valve body 12. This bushing 27 is held in position upon the piston 23 by swaging over the free end 28 of the piston 23, care being taken that the external diameter of the bushing 27 is not increased during this operation.

A pipe or hose connection 30 is provided with suitable screw threads 31 to receive the end of a pipe or hose. It will be understood that this pipe or hose is employed for the delivery of air from this plug connection to the individual can, or to a lateral: and that if desired, the lateral pipe itself may be screwed into the threads 31 in the manner well known in the art. The plug connection 30 has an extending plug 32 proper which is slightly rounded at its extreme end 33 to fit the mating surface of the swaged portion 28 of the piston 23 and to serve in guiding the plug 32 into position. Adjacent this curved portion 33 is a cylindrical portion 34 which terminates in a reduction or reverse taper portion 35 leading to a further and smaller cylindrical portion 36.

A rubber packing washer 37 is inserted in the cavity 15, so that it bears against the shoulder 17. A packing nut 38 is then threaded into the screw threads 16 and adjusted in its compressing relationship upon the packing washer 37, whereby the elasticity of the latter causes it to move its inner wall inwardly in proportion to the compression exerted by the packing nut 38, whereby the internal diameter of the washer 37 is adjusted to the requirements of the plug 32.

In operation, there is a low pressure of air within the pipe line 10, whereby the closure plate 21 and its piston 23 are forced toward the left into the position shown in Fig. 1, whereby the apertures 24 are closed off by the extension 13 of the valve body 12, and further, the surface 22 of the closure plate 21 establishes a tight seal with the chamfered surface 14. Air, therefore, is prevented from passing through the valve from the pipe 10.

Assuming that it is desired to make an air connection through this valve, for example, by means of a lateral pipe 39 threaded into the connection 30, the workman inserts a plug 32 into the channel of the packing nut 38, wherewith the rounded portion 33 of the plug guides it into the packing washer 37, regardless of any slight variation of axial alinement between the pipe 39 and the valve body 12. By forcing lengthwise on the pipe, the plug 32 is caused to pass through the washer 37 and to present its forward annular edge into contact and a substantial sealing relationship with the swaged end 28 of the piston 23, and thus to force this piston toward the right in the figures, into a position substantially as shown in Fig. 2, whereby the apertures 24 are uncovered and air may escape from the pipe 10 through the apertures 24 into the central cavity of the annular piston 23, and thence into the central cavity of the plug 32, and thence to the pipe line: which occurs without any passage along a tortuous way, and without the formation of whirls or eddies in the passage of air. The large diameters of all of the openings and passages assure a very low frictional resistance to the movements of the air.

When it is desired to harvest the ice, the pipe 39 is pulled out substantially in the direction of its length, wherewith, the air pressure on the pipe 10 will force the closure plate 21 toward the left in the figures, and secure the closing of the valve.

It will particularly be noted that the elastic washer 37 serves to seal the periphery of the plug 32 against the passage of air around this plug to the atmosphere: and at the same time, it engages with the wall of the plug, and by seizing the reversely tapered portion 35 thereof, it affords more than a frictional resistance to the withdrawal of this plug, thus insuring the connection 30 in its position, regardless of the air pressure against the plate 21.

It is obvious that the invention is not limited solely to the form of construction or the employment set forth, but that it may be modified in many ways within the scope of the appended claims.

What I claim is:

1. In a quick connection air valve, a valve body having an enlarged bore at one end and a valve seat at the other end, a rubber packing washer in said bore and means to compress the same axially whereby to adjust its internal diameter, a closure member to cooperate with said seat, and a sliding hollow piston guided in said body and fixed to said member and adapted to move with said member in seating and unseating, said piston having apertures through its walls adapted to be uncovered during the unseating movement of said member; a plug body having a plug element adapted to enter said washer and mechanically move said piston to the unseating position, and means to secure a conduit to said plug body, said plug element having a reversely tapered external surface to cooperate with said washer to maintain said plug body in inserted position; said plug body and element, and said piston having bores therethrough, said bores being in alinement with each other and said conduit in the inserted position whereby to afford a clear and direct passage for the air through said valve body.

2. In a quick connection valve, a valve body having a valved aperture with a movable closure member therefor, an elastic packing washer fixed in said body, and a hollow plug member adapted to enter said valve body to mechanically move said closure member to uncover said aperture, said plug member being tapered from a large diameter near its free end to a lesser diameter near its other end so that said washer engages and retains said plug member in its inserted position.

3. In a quick connection valve, a valve body having a bore therethrough of three successive diameters; a hollow piston sliding in the portion of the bore of least diameter and having a closure plate at its end with apertures in the peripheral wall adjacent said closure plate and adapted to be uncovered by a sliding movement of the plate away from the valve body, said plate and the adjacent end of the valve body being constructed and arranged to operate as mating seats to complete the seal, a bushing fixed to said hollow piston and sliding in the bore portion of middle diameter, and an elastic packing ring in said bore portion of greatest diameter, means to clamp said packing ring in said bore; and a plug connection to enter and establish a seal with said packing ring and to move said hollow piston along its axis to uncover said apertures.

4. In a quick connection valve, a valve body having an aperture therethrough with a seat about one end thereof and a shoulder at the other end thereof, an annular closure member slidable in said aperture and having a closure element thereon to cooperate in its inward position with said seat to close the valve and having apertures in its sides to open a continuous passage therethrough in its outward position, a stop on said member to engage said shoulder to limit the outward movement thereof, and an annular plug member adapted to enter said valve body to mechanically move said closure member to its outward position.

5. In a quick connection valve, a metal piston having an integrally formed closure plate at its end, said piston having a reduced portion at the other end, a metal bushing located on said reduced portion, the end of the piston projecting beyond said bushing being upset to hold the bushing assembled on the piston, a valve body having a bore with three successively stepped diameters, the small diameter receiving the piston body, the intermediate diameter receiving the bushing, said valve body being formed adjacent the mouth of the bore of small diameter with a seat for said closure plate, an elastic packing ring, the large diameter of the valve body receiving said packing ring, and being provided at its mouth with internal screw threads, and an externally threaded nut engaging said screw threads to hold the packing ring in position.

6. In a quick connection valve system, a pipe for air under pressure, a valve body having a bore of two differing diameters and threaded into an aperture in the wall of the pipe, a hollow piston sliding in the bore portion of lesser diameter, a closure plate fixed to said piston and adapted to establish a seal with the smaller end of said valve body, a bushing fixed to said piston and sliding in said bore portion of greater diameter, said valve body having apertures which in the open position of the valve are within the pipe to permit the free and direct flow of fluid from the pipe through the peripheral wall of said hollow piston when said closing plate is moved away from the end of the valve body, said piston being adapted to be normally forced into closed position by the compressed air in the pipe, and a hollow plug member adapted to enter the valve body to force said piston into open position against the air pressure and therewith to establish a free connection with the passage in said hollow piston.

In testimony whereof, I affix my signature.

NORMAN H. GAY.